United States Patent
Deck et al.

(10) Patent No.: US 11,347,854 B2
(45) Date of Patent: May 31, 2022

(54) SYSTEM VALIDATOR

(71) Applicant: Dell Products L.P., Round Rock, TX (US)

(72) Inventors: Richard C. Deck, Austin, TX (US); Scott C. Lauffer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 551 days.

(21) Appl. No.: 16/516,399

(22) Filed: Jul. 19, 2019

(65) Prior Publication Data

US 2021/0019413 A1    Jan. 21, 2021

(51) Int. Cl.

| G06T 19/00 | (2011.01) |
|---|---|
| G06F 21/57 | (2013.01) |
| G06F 21/44 | (2013.01) |
| G06F 21/45 | (2013.01) |

(52) U.S. Cl.
CPC .............. *G06F 21/57* (2013.01); *G06F 21/44* (2013.01); *G06F 21/45* (2013.01); *G06T 19/006* (2013.01)

(58) Field of Classification Search
None
See application file for complete search history.

(56) References Cited

PUBLICATIONS

Herbert et al., Design considerations for combining augmented reality with intelligent tutors, Dec. 2018, Computers & Graphics 77, 166-182 (Year: 2018).*
Westerfield et al., Intelligent Augmented Reality Training for Motherboard Assembly, Nov. 4, 2014, Int J Artif Intell Educ, 157-172 (Year: 2014).*

* cited by examiner

*Primary Examiner* — Robert J Craddock
(74) *Attorney, Agent, or Firm* — Terrile, Cannatti & Chambers; Stephen A. Terrile (57) ABSTRACT

A system, method, and computer-readable medium for validating the components and configuration of a system, comprising: identifying the system, identifying a set of components installed in the system, associating the system with a set of components installed therein, generating a system model comprised of component models for the set of components in a design configuration, comparing the system model with the system, and displaying the model or an overlay based on the model relative to the system or an image of the system and an indicator that all components are installed properly and the system is in a design configuration or an indicator that a component is installed improperly or the system is not in the design configuration.

18 Claims, 7 Drawing Sheets

SYSTEM VALIDATOR

BACKGROUND OF THE INVENTION

Field of the Invention

The present invention relates to information handling systems. More specifically, embodiments of the invention relate to using an augmented reality system for validating system components and the system configuration.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium are disclosed for validating the components and configuration of a system. In certain embodiments, a validation operation includes identifying a system; associating a set of components installed in the system; generating a system model comprised of a set of component models associated with the set of components in a design configuration; comparing the system model with the system; and displaying the model or an overlay based on the model relative to the system or an image of the system and an indicator that all components are installed properly and the system is in a design configuration or an indicator that a component is missing or installed improperly or the system is not in the design configuration. In certain embodiments, displaying a model or an overlay based on the model with an image of the system comprises displaying one or more of performance data associated with the set of installed components, a set of options for servicing the system, removal steps for the set of components, and installation steps for reinstalling the removed components or installing replacement components. In certain embodiments, an overlay is presented to present performance data relative to a component, options for upgrading the system, removal steps for a set of components, and installation steps for installing upgrade components. In certain embodiments, a repository stores a set of overlays for the system, wherein each overlay in the repository is generated based on a system model of the components in the BOM and the components are in a design configuration.

Validating a system during a servicing operation comprises capturing system identification information; retrieving a system model or an overlay based on the system model; comparing the system model with the system; and displaying the model or an overlay based on the model relative to the system or an image of the system and an indicator that all components are installed properly and the system is in a design configuration or an indicator that a component is missing or installed improperly or the system is not in the design configuration. In certain embodiments, an augmented reality (AR) system captures the system identification information.

In certain embodiments, displaying the model or an overlay based on the model relative to the system or an image of the system comprises identifying missing components, improperly installed components, or a configuration deviating from a design configuration. In certain embodiments, the system is analyzed to validate the configuration, wherein analyzing comprises retrieving actual performance data associated with the set of installed components. If the actual performance data is outside a range of tested performance data, embodiments of a validation operation identify missing components, improperly installed components, or a configuration deviating from a design configuration; and send a set of options for servicing the system. In certain embodiments, the set of options for servicing the system comprises removal steps for the set of components, and installation steps for reinstalling the removed components or installing replacement components into a design configuration.

In certain embodiments, in an upgrading operation, an augmented reality (AR) system captures system identification information. System and component performance data is analyzed, and a set of upgrade components and an upgrade design configuration are sent to the AR system. In certain embodiments, a set of options for upgrading the system is sent to the AR system, wherein the set of options for upgrading the system comprises removal steps for the set of components and installation steps for reinstalling the removed components or installing replacement components into a design configuration.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

It is known to manufacture various systems using assembly processes in which all of the systems look similar on the outside but have different components or different configurations on the inside. Ideally, a system chassis is designed to allow variations and modification for customization. However, variations in the components and configuration can affect the system performance. Components of the same component type supplied by different vendors or with different performance characteristics can vary in operating characteristics such as performance, power consumption and heat generation. Similarly, a system configurable to accommodate various combinations of components for customization can have variations in performance. Thus, two systems can have the same basic component types but have different performance due to variations in the components and configuration.

Ideally in information handling systems, all components of the same component type have the same performance data, are installed properly and the system operates as designed. However, it is possible for a component to be installed improperly, to be inadvertently omitted, or to operate with performance data outside a range of tested performance data. An improperly installed component refers to a component that is installed in a wrong location, installed in an incorrect orientation, installed with insufficient connectivity, or otherwise installed such that the component is inoperable or is operable but causes the system to operate with actual performance data to be outside a range of tested performance data. Examples of improperly installed components in an information handling system include, but are not limited to, a PCI card installed in the wrong slot, a fan installed backward, and a memory card installed but not locked in place. The result of a missing component may be such that the system is inoperable, which ideally is noticed at an inspection point during manufacturing and corrected before the system is shipped to a customer.

More problematic results occur when the component is improperly installed but the system complexity makes it difficult for an inspector to see the improper installation. If the system is operable but operates with performance data outside a range of tested performance data, the system might pass inspection and be installed, and the effects of the component operating with undesired performance data might only be realized after the system sends an error code or other indicator of an issue. One response to each of these situations involves total replacement of the system, but this is inefficient in terms of cost and time. A second response involves sending a technician to service the system, which can be costly but has the benefit that a skilled technician sees the system in its operating environment and might see issues contributing to the error code that require servicing. As part of the servicing process, the technician inspects the system to ensure all components are the correct components for that system and verifies that each component is installed properly with respect to a design configuration. For example, an error code may indicate a fan failure, but an error code rarely provides a true understanding of what is causing the error code. Accordingly, a technician responding to the error code indicating a fan failure inspects the fan to ensure the fan is operational, ensures it is the correct fan for the system, verifies the fan is oriented to move air in the correct direction, and verifies the system is configured with the fan positioned near the components that need cooling. The technician compares the fan specifications to a bill of materials (BOM) to validate the fan is the correct fan, but also needs to check the fan connector to ensure the fan is locked in place and needs to know the correct fan position and orientation relative to other components.

It is common in information handling system environments to upgrade components in systems to improve processing or extend the service life of the system. Often, a system can be upgraded with any of multiple component options resulting in multiple possible configurations. Typically, the components are listed on a spreadsheet and the technician or the customer selects the components to be upgraded. With this approach, the operation or performance of the system depends on the knowledge of the person upgrading the system, including knowledge of how the components and the configuration of the system will be affected by the upgrade. The system or some of the possible components might not work as well in a requested configuration. As a result, a customer requesting an upgrade with specific components or assembled in a configuration does not know that those components could negatively affect the operation or performance of a component or the system. Furthermore, if the technician is unaware of the effects of the requested upgrade, customer satisfaction could deteriorate due to ongoing performance issues caused by the new components or the configuration.

A system, method, and computer-readable medium are disclosed for validating the components and configuration of a system. In certain embodiments, a validation operation includes identifying a system; associating the system with a set of components installed therein; generating a system model comprised of component models for the set of components in a design configuration; comparing the system model with the system; and displaying the model or an overlay based on the model relative to the system or an image of the system and an indicator that all components are installed properly and the system is in a design configuration or an indicator that a component is missing or installed improperly or the system is not in the design configuration.

In a servicing operation, system identification information is captured, a system model or an overlay based on the system model is retrieved from a repository, the system model is compared with the system and a composite view is displayed on an augmented reality (AR) system. The composite view displays the model or an overlay based on the model, the system or an image of the system, and an indicator that all components are installed properly and the system is in a design configuration or an indicator that a component is missing or installed improperly or the system is not in the design configuration. In certain embodiments, the AR system captures an image of the system, component performance data and system performance data are analyzed, and a set of options for servicing the system is sent to the AR system. In certain embodiments, sending the set of options for servicing the system comprises displaying one or more of performance data associated with the set of installed components, a set of options for servicing the system, removal steps for the set of components, and installation steps for reinstalling the removed components or installing replacement components.

In an upgrade operation, system identification information is captured, component performance data for the installed components is compared with performance data for tested upgrade components, a set of components for upgrading is identified, an upgraded system model or an overlay based on the upgraded system model based on the upgrade components is retrieved from a repository, and a composite view is displayed on an augmented reality (AR) system. The composite view displays the model or an overlay based on the model, the system or an image of the system and the upgraded system model or an overlay based on the upgraded system model. In certain embodiments, a composite view with an overlay oriented relative to an image of the system is displayed to present performance data relative to a component, a set of options for upgrading the system, removal steps for a set of components, and installation steps for installing upgrade components. In certain embodiments, a repository stores a set of overlays for the system, wherein each overlay in the repository is generated based on an upgraded system model of the upgraded components in a design configuration.

In certain embodiments, displaying a model or an overlay based on the model relative to the system or an image of the system comprises identifying improperly installed components, missing components, installed components with performance data outside a range of tested performance data, or comparing the system model with the system to determine the system is in a configuration deviating from a design configuration. In certain embodiments, the system is analyzed to validate the configuration, wherein analyzing comprises retrieving actual performance data associated with the set of installed components. When the system is in operation, if the actual performance data is outside a range of tested performance data, embodiments of a validation operation identify improperly installed components, missing components, installed components with performance data outside a range of tested performance data, or determine the system is in a configuration deviating from a design configuration; and send a set of options for servicing the system. In certain embodiments, a set of options for servicing the system comprises removal steps for the set of components, and installation steps for reinstalling the removed components or installing replacement components into a design configuration.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
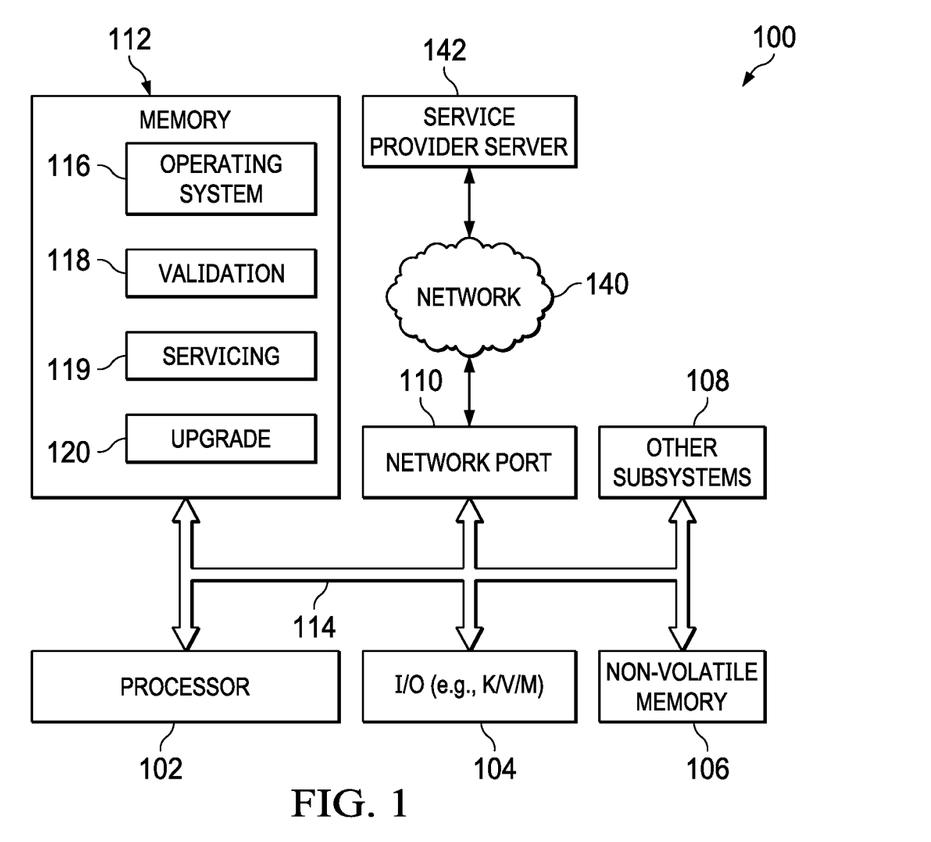
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one of a validation module 118, a service module 119 and an upgrade module 120.

A validation module 118 performs a validation operation for a system. A validation operation is initiated during an assembly process, at installation, during servicing or during a system upgrade. The validation operation retrieves a system model that contains a component model for each component installed in the system, compares the system model with the actual system, and displays a composite view of the system with the system model or an overlay based on the system model, along with an indicator that the system is validated or an indicator for any missing or improperly installed components or that the system is not in a design configuration.

A service module 119 performs a servicing operation. In certain embodiments, the service module receives system identification information from an AR system, identifies a system based on the system identification information, retrieves performance data for the system, compares the performance data with a tested performance data, and returns a set of options for servicing the system to the AR system. In certain embodiments, the service module determines if the actual performance is above a threshold, below a threshold, or otherwise outside a range of tested performance data. In certain embodiments, if the validation module sends an indicator that there are missing or improperly installed components or that the system is not in a design configuration, the service module identifies a list of servicing options including one or more of a set of replacement components and at least one design configuration, and sends instructions for servicing the system to the AR system. In certain embodiments, if the validation module sends an indicator that there are missing or improperly installed components or that the system is not in a design configuration, the servicing module analyzes actual performance data for installed components, compares the actual performance data for components installed in the system with tested performance data for the components, and sends instructions for servicing the system based on the comparison. In certain embodiments, the servicing operation includes sending removal instructions for installed components and installation instructions for the removed components or replacement components.

The upgrade module 120 performs an upgrade operation. The upgrade operation module analyzes performance data for installed components in a system, identifies a list of possible upgrade components, and determines one or more of a set of upgrade components and at least one upgrade configuration associated with the system. In certain embodiments, the list of possible upgrade components is based on a customer request. In certain embodiments, the list of possible upgrade components is based on comparison of actual performance data for installed components with tested performance data for a set of upgrade components or an error code generated by the system. In certain embodiments, the list of possible upgrade components is based on the size, shape, or other physical characteristic of the possible upgrade components. In certain embodiments, the upgrade operation includes sending a set of design configurations, each design configuration having different possible components. In certain embodiments, the upgrade operation includes sending removal instructions for installed components and installation instructions for upgrade components.

Figure 2:
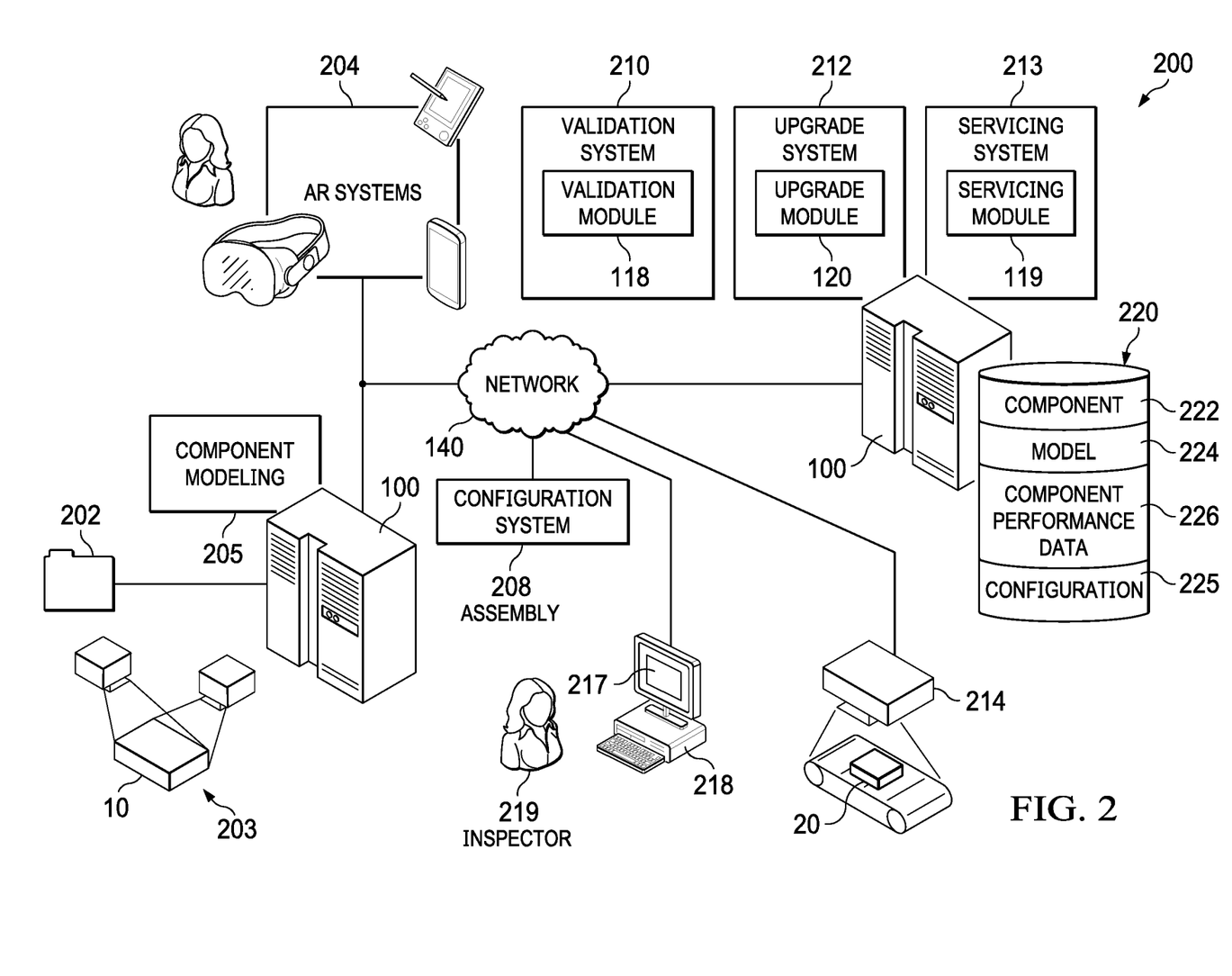
FIG. 2 shows a block diagram of a validation environment.

FIG. 2 is a block diagram of a validation environment 200 implemented in accordance with an embodiment of the invention. The validation environment 200 includes a hardware validation system 210, a service system 213 and an upgrade system 212. In various embodiments, a validation system 210 executes on a hardware processor 102 of an information handling system 100.

Information handling system 100 receives or otherwise obtains component identification information for components usable in a system. Component identification information for each component 10 includes serial numbers, lot numbers, performance parameters and any other information used to identify that component. In certain embodiments, component identification information includes a range of performance data that has been tested to meet system performance requirements. Component identification information is stored in a component repository 222.

The information handling system 100 receives or otherwise obtains component modeling information corresponding to each component 10 in the component repository 222. In certain embodiments, component modeling information comprises a file 202 such as a CAD file received or generated at the time of manufacture of the component. In certain embodiments, component modeling information is obtained by a scanning system 203 scanning a component 10. The component modeling information is stored in a repository. In certain embodiments, component modeling information is stored in a model repository 224.

The information handling system receives or otherwise obtains configuration information for a system 20. In certain embodiments, the system configuration information corresponds to a set of design configurations, wherein each design configuration comprises a set of components 10 in a configuration that has been tested to operate within a range of performance parameters. The configuration information for each design configuration is stored in a configuration repository 225. In certain embodiments, system configuration information comprises an overlay generated for that system based on the component modeling information in a design configuration selected from the design configurations previously tested and stored in the configuration repository.

In an assembly process for a system 20, the validation system 210 analyzes a bill of materials (BOM) for the system and identifies a set of components that matches the BOM for the system 20. In certain embodiments, a user requests a system with a specified set of performance parameters, the validation system accesses the component information repository 222 to identify a set of possible components 10 corresponding to the specified performance parameters, the user selects a preferred set of components, and the information handling system creates a BOM and stores the BOM in the component information repository.

Also during assembly of the system, the configuration is compared to a set of design configurations. In certain embodiments, a scanner 214 captures an image of the system 20. The validation module retrieves the BOM from the BOM repository to identify the components assembled in the system, retrieves a model based on the installed components from a model repository and retrieves configuration information from the configuration repository. In certain embodiments, the validation module retrieves an overlay or aggregates the component models into an overlay based on a design configuration information. The validation module compares the overlay with the captured image to determine if the components are properly installed in the correct configuration. If there are any deviations, the validation module sends the overlay or portion thereof to the monitor 218 for an inspector 219 to review. In certain embodiments, a composite view is displayed showing an image 217 of the system, the system model or an overlay based on the system model, and an indicator that all components are installed properly and the system is in a design configuration or an indicator that a component is missing or installed improperly or the system is not in the design configuration. In certain embodiments, after a scan of the system 20 is performed the system 20 may be analyzed to determine an optimal configuration of any installed (or to be installed) components. The optimal configuration of components may then be presented as a model or an overlay based on the model.

All components associated with the system have a corresponding three-dimensional (3D) model stored in a model repository 224. In certain embodiments, each 3D model stored in the model repository comprises information for distinguishing between component types. Examples of information for distinguishing between components types include the size, dimensions and shape of the component or portion of the component. For example, in an information handling system validation environment, a 3D model of a memory card might be distinguishable from a 3D model of a video card based on a size or shape of the component or a size or shape of the connector. In certain embodiments, each 3D model comprises information for distinguishing from other 3D models of the same component type. In an information handling system validation environment with components supplied by various vendors and manufacturers, with different configurations and power and processing requirements, information for distinguishing between variations of a component type include, but are not limited to, color, texture and location of text or graphics. For example, a video card from a first manufacturer might be the same size as a video card from the same manufacturer or another manufacturer, but the color, texture, and graphics associated with their 3D models may be used to distinguish the two video cards. A component modeling system 205 can receive a CAD file 202 or other file used to manufacture a component or can receive a file generated by a scanner 203 scanning a manufactured component 10. When a system is being constructed, the component modeling system 205 or the validation module ensures the model repository has a corresponding 3D model for each installed component in the system.

At an inspection point, the validation module compares the actual system to a virtual model of the system. In certain embodiments, the validation module compares the actual system to the virtual model at multiple inspection points throughout the assembly process to validate the assembly process. The validation module ensures installed components match the components listed in the BOM and the components are installed properly in a system configuration that matches a design configuration. In certain embodiments, a scanner, camera or other hardware captures an image of the system and compares the system to a system model.

During installation of the system, an AR system scans a QR code, a SKU or some other system identification, a repository associating the system identification with a system is accessed and a set of components is associated with the system. In certain embodiments, a validation operation accesses a repository containing component information related to one or more of performance, geometry and installation and removal steps. One or more of performance data associated with the set of installed components, a set of options for servicing the system, removal steps for the set of components, and installation steps for reinstalling the removed components or installing replacement components are retrieved from the repository. In certain embodiments, the validation module 118 communicates the information to an augmented reality (AR) system 204, allowing a user to visualize a set of internal components for a system without shutting down the system or opening the system.

During servicing of the system, an AR system 204 scans a QR code, a SKU or some other system identification, a repository associating the system identification with a system is accessed and a set of components is associated with the system. Component information related to one or more of performance, geometry and installation and removal steps is retrieved from a repository. One or more of performance data associated with the set of installed components, a set of options for servicing the system, removal steps for the set of components, and installation steps for reinstalling the removed components or installing replacement components are retrieved from the repository. In certain embodiments, an internal camera is accessed to verify that a component is installed properly and to inspect the system. In certain embodiments, a service module accesses the internal camera to identify components in the system. In certain embodiments, the service module receives information corresponding to a component and accesses the internal camera to identify a reason why the component is not operating within expected performance parameters. In certain embodiments, a composite view of the system and a system model or overlay is displayed to present performance data relative to a component, instructions for servicing the system, removal steps for the set of components, and installation steps for reinstalling the removed components or installing replacement components.

As used herein, an augmented reality (AR) system 204 refers to an information handling system such as a tablet computer, a personal digital assistant (PDA), a smart phone, a mobile telephone, smart goggles. The AR system includes a camera or scanning device, a screen or other display, and is capable of communicating and processing data. In various embodiments, the AR system 204 is configured to present a validation system user interface. In various embodiments, the AR system 204 receives commands from a user to capture system and component information, communicates with the validation system, the service system and the upgrade system, and receives models, overlays and images of the system through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the component validation system 210 includes a validation module 118 which performs a validation operation. In various embodiments, the upgrade system 212 includes an upgrade module 120 which performs an upgrade operation, and a servicing system 213 includes a servicing module 119. In various embodiments, the validation environment 200 includes a storage repository 220. The storage repository may be local to the system executing the validation module 118, the servicing module 119 or the upgrade module 120 or may be executed remotely. In various embodiments, the storage repository includes one or more of a component identification information repository 222, a model repository 224, a performance data repository 226 and a configuration repository 225.

Figure 3:
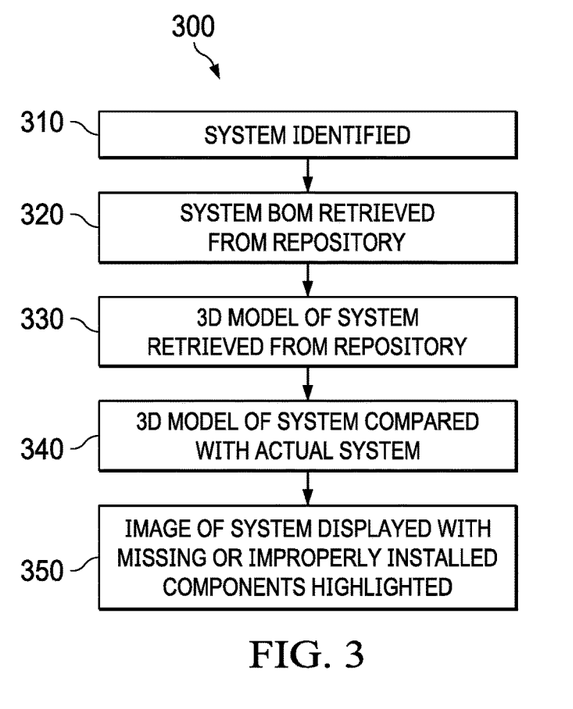
FIG. 3 shows a high level flow chart of an assembly validation operation.

FIG. 3 shows a high level flow chart of a validation operation 300. More specifically, the validation operation begins at step 310 by identifying the system. In an assembly environment, a system moves past a scanner, which captures system identification information. The system identification information is compared with system identification information stored in a repository and the system is identified. In step 320, a bill of materials (BOM) or other list of the components in the system is retrieved from the component information repository 222. Next, at step 330, a model is retrieved from a model repository 224. A model is stored in a repository or is generated from the component model information stored in the model repository and configuration information stored in the configuration repository. At step 340, the system model or an overlay based on the system model is compared with the system. In step 350, a composite view 217 is displayed on a monitor 218 showing an image of the system, the system model or an overlay based on the system model, and an indicator that all components are installed properly and the system is in a design configuration or an indicator that a component is missing or installed improperly or the system is not in the design configuration. An inspector 219 is able to easily see what components are indicated as being missing or improperly installed.

Figure 4:
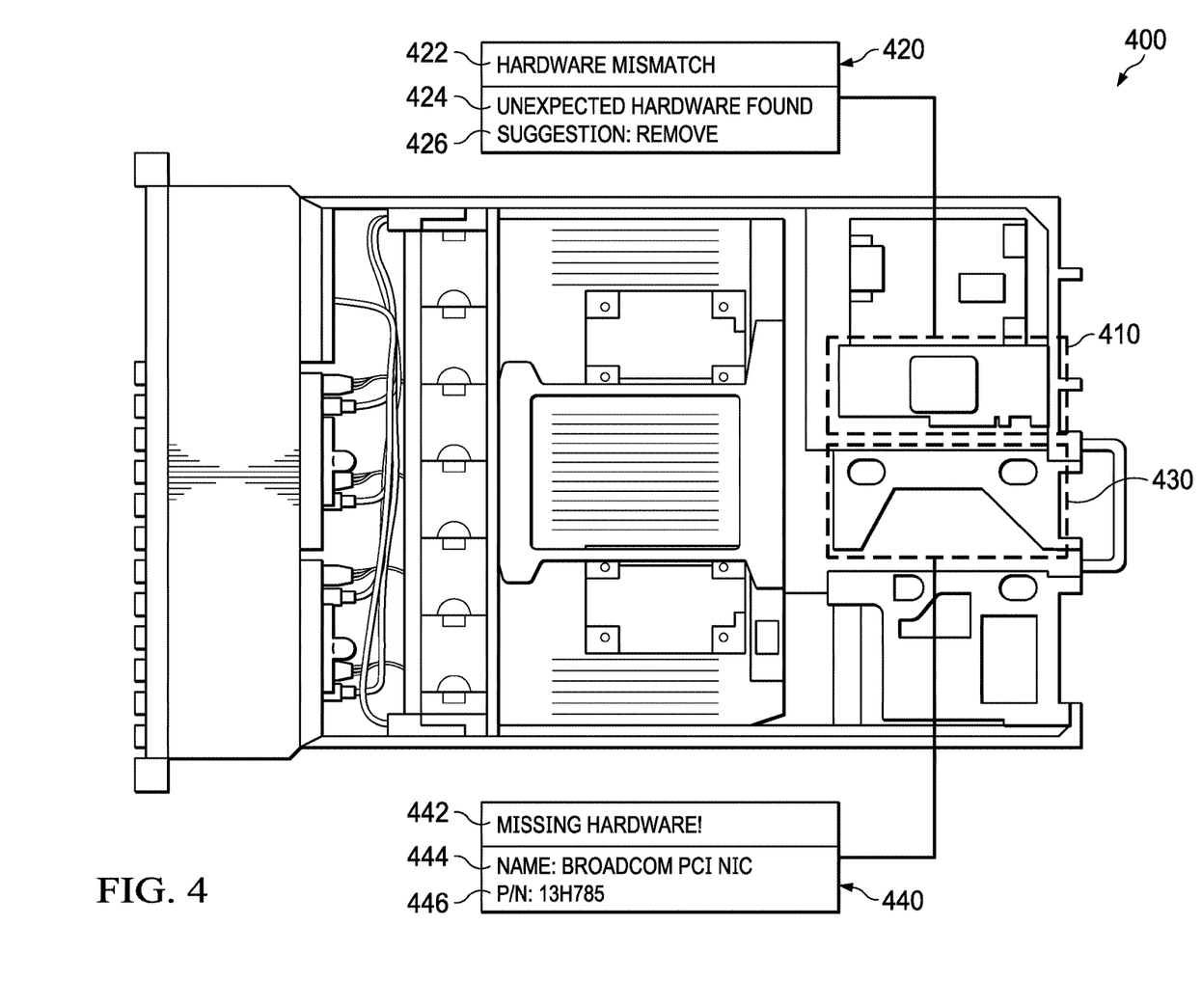
FIG. 4 shows a top view of an example system with an overlay in an assembly validation operation.

FIG. 4 shows a composite view of a front view of an example system 400 with an overlay and two indicators 420, 440. In certain embodiments, a first overlay 410 corresponds to the installation of components. Indicator 420 corresponding to overlay 410 identifies a first component that does not match the BOM and indicator 440 corresponding to overlay 430 identifies a second component that is missing. Each of indicators 420 and 440 display text information 422, 442 giving more detail associated with the issue to be resolved. In certain embodiments, an inspector 219 selecting indicator 420 or 440 has access to more detailed information about the system and how to correct the assembly. In certain embodiments, selecting a validation indicator allows an inspector to identify when in the assembly process the issue occurred, how to resolve the issue, how to remove incorrect components and install the correct components, and other assembly options.

Figure 5:
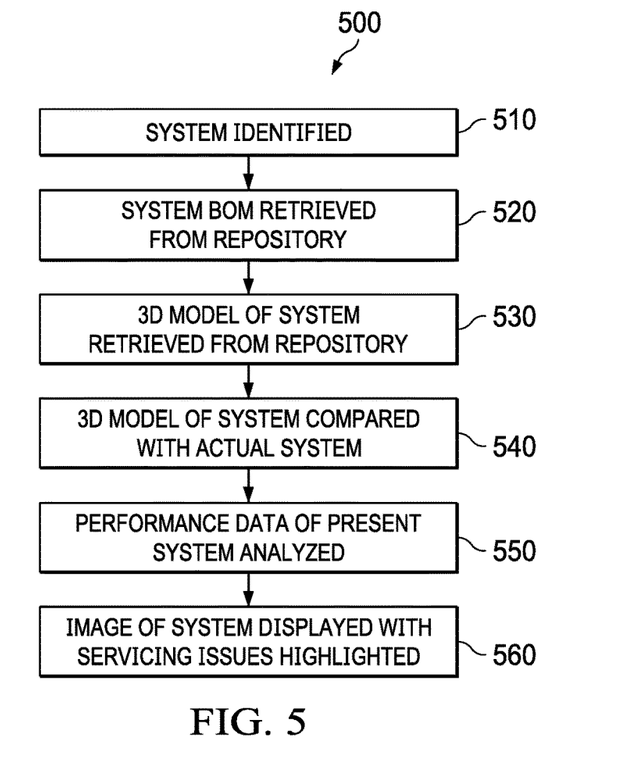
FIG. 5 shows a high level flow chart of a servicing validation operation.

FIG. 5 shows a high level flow chart of a servicing operation 500. The upgrade operation 500 begins at step 510 by identifying the system. Next, a BOM (bill of materials) associated with the system is retrieved at step 520. At step 530, a model of the system is retrieved from a repository. At step 540, the system model is compared with the system. This ensures the servicing operation is being performed on the correct system, that all components are properly installed, and the system is in a design configuration. If the components are all properly installed and in a design configuration, the system is validated. If any of these conditions are not met, the servicing operation continues to step 550, in which the performance data of the system is analyzed. Next at step 540, the servicing operation provides a list or indicator of servicing issues to be resolved. At step 750, a composite image of the system with any servicing issues to be resolved is displayed on the AR system. In certain embodiments, the composite view of the system and a system model or overlay is displayed to present performance data relative to a component. The composite view includes instructions for servicing the system, removal steps for the set of components, and installation steps for reinstalling the removed components or installing replacement components.

Figure 6:
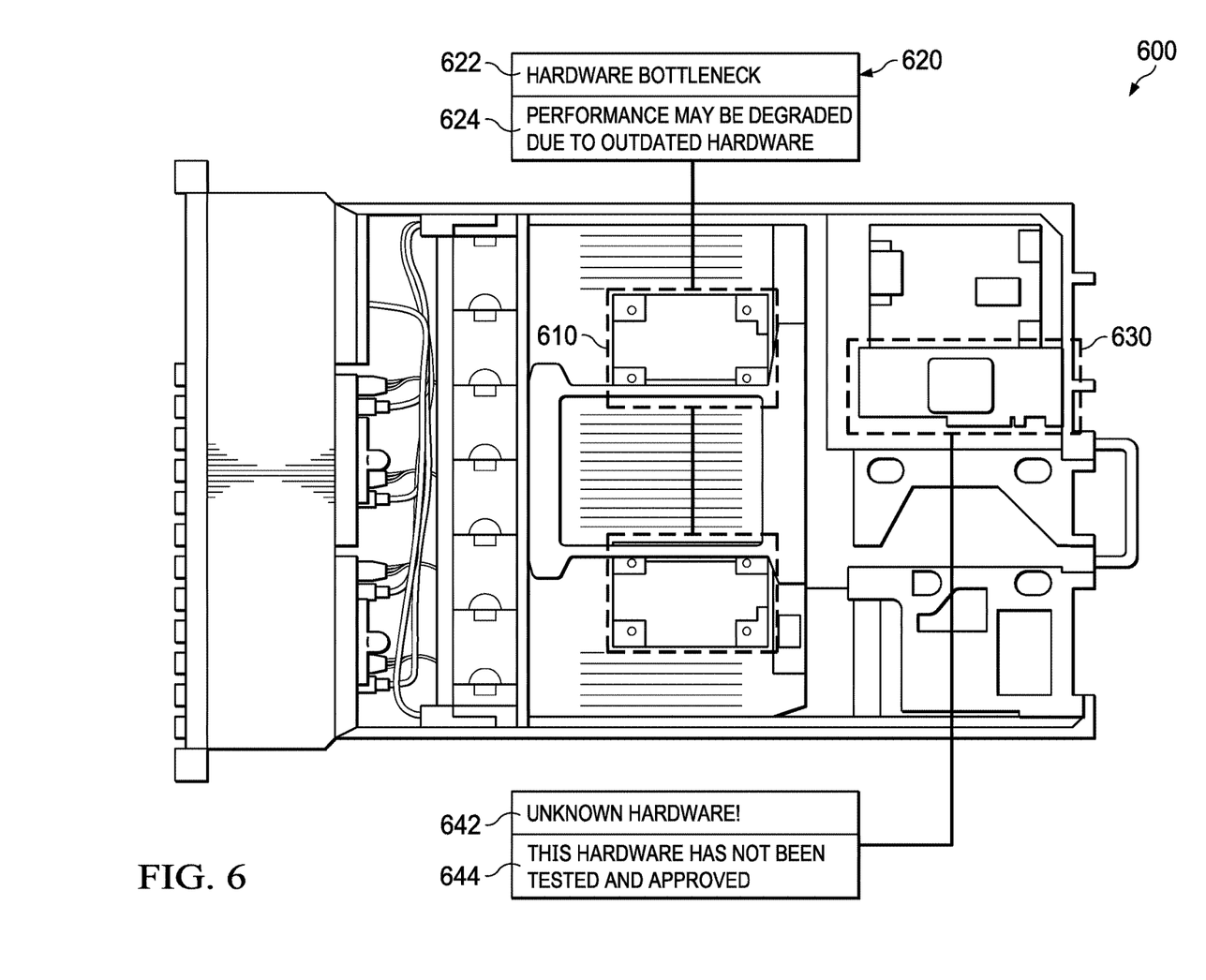
FIG. 6 shows a top view of an example system with an overlay in a servicing validation operation.

Referring to FIG. 6, a front view of an example system 600 is shown. In the example a composite view displays the system with an overlay with two indicators 620 and 640 of servicing issues. More specifically, indicator 620 identifies a first component 610 that is causing a processing bottleneck and indicator 640 identifies a second component 630 that does not match the BOM or is not on a list of components that have been previously tested and approved. Each of indicators 620 and 640 display text information 624 giving more detail associated with the issue to be resolved. In certain embodiments, selecting indicator 620 or 640 allows a user to access more detailed information about servicing the system. In certain embodiments, selecting a servicing indicator allows a user to view instructions on how the issue has affected performance, how to resolve the issue, how the performance of the system will change, how to remove the installed components and install replacement components, and other servicing options.

Figure 7:
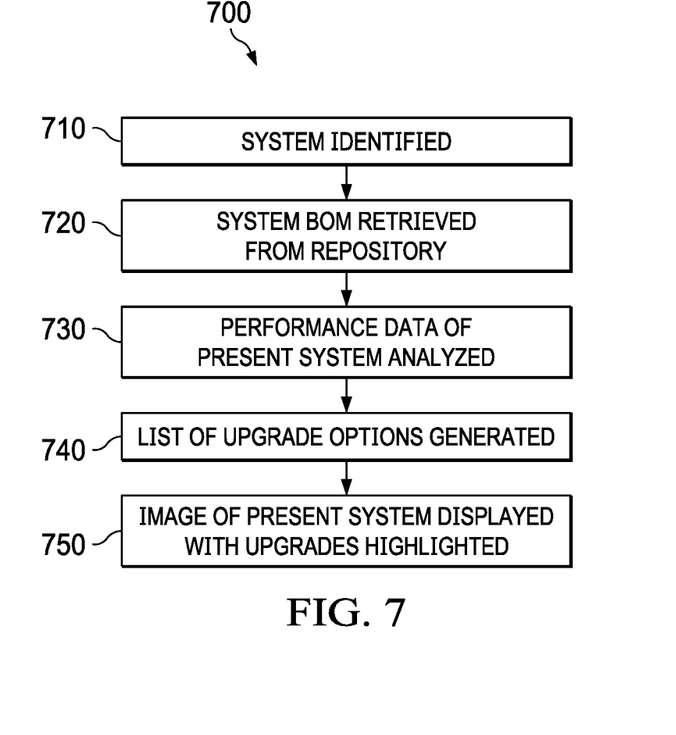
FIG. 7 shows a high level flow chart of an upgrade validation operation.

FIG. 7 shows a high level flow chart of a upgrade operation 700. The upgrade operation 700 begins at step 710 by identifying the system. Next, a BOM (bill of materials) associated with the system is retrieved at step 720. Next at step 730, the performance data of the system is analyzed. Performance data includes processing speed, power consumption, heat generation, and other data associated with the performance of a component or the system. Next at step 740, the upgrade operation provides a list of upgrade options. In certain embodiments, the list of possible upgrade components is based on comparison of actual performance data for installed components with tested performance data for a set of upgrade components or an error code generated by the system. In certain embodiments, the list of possible upgrade components is based on the size, shape, or other physical characteristic of the possible upgrade components. In certain embodiments, the upgrade operation includes sending a set of design configurations, each design configuration having different possible components. At step 750, a composite image of the system with any upgrade options is displayed on the AR system. In certain embodiments, the composite view of the system and a system model or overlay is displayed to present performance data relative to a component. The composite view includes options for upgrading the system, removal steps for the set of components, and installation steps for reinstalling any removed components or installing upgrade components.

Figure 8:
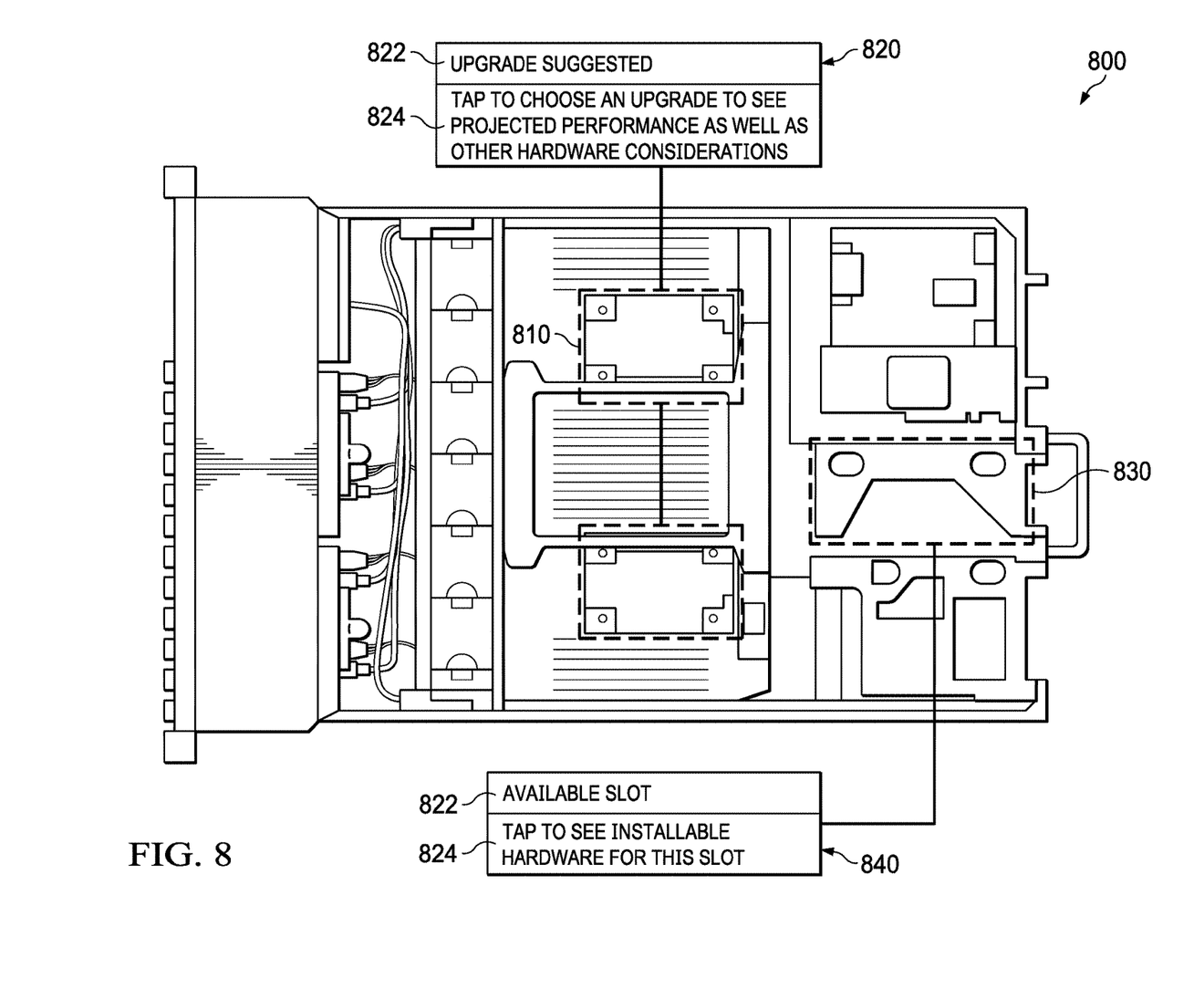
FIG. 8 shows a top view of an example system with an overlay in an upgrade validation operation.

Referring to FIG. 8, a front view of an example system 800 is shown. In the example a composite view displays the system with an overlay with two indicators 820 and 840. More specifically, indicator 820 identifies a first component 810 with a suggested option 822 for upgrading the component and indicator 840 identifies a second component 830 with a suggested option for changing the configuration of the system. Each of indicators 820 and 840 display text information 824 giving more detail associated with the upgrade option. In certain embodiments, selecting indicator 820 or 840 allows a user to access more detailed information about upgrade options. In certain embodiments, selecting an upgrade option allows a user to view instructions on how to complete the upgrade, how the performance of the system will change, and other upgrade options complementary to the selected upgrade option.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for validating a system, comprising:
   identifying a system;
   identifying a set of components installed in the system;
   associating the system with a set of components installed therein;
   generating a system model comprised of component models for the set of components in a design configuration;
   comparing the system model with the system; and
   displaying the model or an overlay based on the model relative to the system or an image of the system and an indicator that all components are installed properly and the system is in a design configuration or an indicator that a component is installed improperly or the system is not in the design configuration.

2. The method of claim 1, wherein:
   the model or overlay based on the model is stored in a repository.

3. The method of claim 2, wherein:
   the overlay comprises a plurality of overlays, wherein each overlay comprises component identification information and one or more of performance data for the set of components, performance data for a set of replacement components and performance data for a set of upgrade components.

4. The method of claim 1, wherein:
   component identification information corresponding to a set of installed components is compared with component identification information stored in a repository.

5. The method of claim 4, wherein:
   an augmented reality (AR) system captures system identification information and the system is identified based on the system identification information.

6. The method of claim 1, wherein:
   displaying a composite view of one or more of the system, the system model and the overlay comprises displaying one or more of performance data relative to a component, instructions for servicing the system, removal steps for the set of components, and installation steps for reinstalling the removed components or installing replacement components.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   identifying a system;
   identifying a set of components installed in the system;
   associating the system with a set of components installed therein;
   generating a system model comprised of component models for the set of components in a design configuration;
   comparing the system model with the system; and
   displaying the model or an overlay based on the model relative to the system or an image of the system and an indicator that all components are installed properly and the system is in a design configuration or an indicator that a component is installed improperly or the system is not in the design configuration.

8. The system of claim 7, wherein:
   the model or overlay based on the model is stored in a repository.

9. The system of claim 8, wherein:
   the overlay comprises a plurality of overlays, wherein each overlay comprises component identification information and one or more of performance data for the set of components, performance data for a set of replacement components and performance data for a set of upgrade components.

10. The system of claim 7, wherein:
    component identification information corresponding to a set of installed components is compared with component identification information stored in a repository.

11. The system of claim 10, wherein:
    an augmented reality (AR) system captures system identification information and the system is identified based on the system identification information.

12. The system of claim 11, wherein:
    displaying a composite view of one or more of the system, the system model and the overlay comprises displaying one or more of performance data relative to a component, instructions for servicing the system, removal steps for the set of components, and installation steps for reinstalling the removed components or installing replacement components.

13. A non-transitory, computer-readable storage medium embodying computer program code, the computer program code comprising computer executable instructions configured for:
    identifying a system;
    identifying a set of components installed in the system;
    associating the system with a set of components installed therein;
    generating a system model comprised of component models for the set of components in a design configuration;
    comparing the system model with the system; and
    displaying the model or an overlay based on the model relative to the system or an image of the system and an indicator that all components are installed properly and the system is in a design configuration or an indicator that a component is installed improperly or the system is not in the design configuration.

14. The non-transitory, computer-readable storage medium of claim 13, wherein:
    the model or overlay based on the model is stored in a repository.

15. The non-transitory, computer-readable storage medium of claim 14, wherein: the overlay comprises a plurality of overlays, wherein each overlay comprises component identification information and one or more of performance data for the set of components, performance data for a set of replacement components and performance data for a set of upgrade components.

16. The non-transitory, computer-readable storage medium of claim 13, wherein:
component identification information corresponding to a set of installed components is compared with component identification information stored in a repository.

17. The non-transitory, computer-readable storage medium of claim 16, wherein:
an augmented reality (AR) system captures system identification information and the system is identified based on the system identification information.

18. The non-transitory, computer-readable storage medium of claim 17, wherein:
displaying a composite view of one or more of the system, the system model and the overlay comprises displaying one or more of performance data relative to a component, instructions for servicing the system, removal steps for the set of components, and installation steps for reinstalling the removed components or installing replacement components.

\* \* \* \* \*